United States Patent Office
3,611,495
Patented Oct. 12, 1971

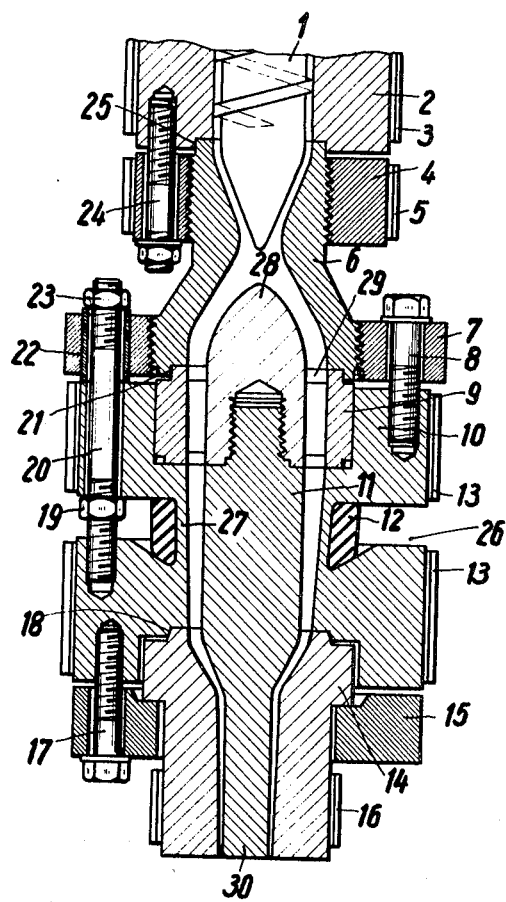

3,611,495
CENTERING DEVICE FOR ANNULAR DIES FOR THE MANUFACTURE OF PLASTICS MATERIAL SHAPES
Erhard Langecker, Hohbuschener Weg 5, Meinerzhagen, Westphalia, Germany
Filed June 27, 1969, Ser. No. 837,272
Claims priority, application Germany, Oct. 18, 1968, P 18 04 640.7
Int. Cl. B29d 23/04
U.S. Cl. 18—14 V    6 Claims

ABSTRACT OF THE DISCLOSURE

A centering device for annular dies for the manufacture of plastic-material bodies, wherein a die jacket is transversely adjustable in relation to a die core by clamping means extending parallel to the die axis. The clamping means engages two portions separated by an annular weakening of the exterior of the die jacket lying transversely to the die axis, and wherein the axial spacing of the die mouth from the annular weakening in relation to the rigidity of the die jacket is such that upon adjustment of the clamping means there is no significant distribution of the outer periphery of the die orifice defined by the die jacket.

(1) Field of the invention

The invention concerns a centering device for annular dies for the manufacturing of pipes or tubes for further working up in the blowing process to form foils or hollow bodies.

(2) Background of the invention

Annular dies of this type for the manufacture of tubular plastic-material shapes consist of an inner die core and an outer die jacket. The external diameter of the die core is less than the internal diameter of the die jacket, so that with centric arrangement of the two parts an annular gap results, which is known as the die gap, from which the plasticized synthetic-resin material is extruded by means of an extruder worm. The die jacket is arranged fixedly on the tube-head jacket, which is itself fixedly connected to the extruder jacket which receives the extruder worm. As a rule, the core with its mandrel is fastened to a mandrel holder. A prerequisite for the satisfactory working of annular dies of this type is that the die core should be aligned with accuracy concentrically with the die jacket, so that a linear extrusion is ensured in the direction of the die axis. Because during the mounting of die core and die jacket, the concentricity of the two, determined by the manufacturing step, is not always maintained, and because moreover during operation, eccentricity, even if only slight, may occur through the displacement of die jacket and die core in relation to one another, it is necessary to correct any eccentricity between the die jacket and die core. This is done by means of a suitable device. If the die jacket and die core are eccentrically positioned, the width at one side of the annular gap is greater than that at the opposite side. As a result the material extruded under pressure issues more quickly at the place where the cross-section width is larger than at the place of lesser cross-section so that the extruded tube has an arcuate shape which excludes the possibility of forming pipes, tubes, foils or hollow bodies with uniform wall thickness. A fundamental requirement for centering devices is that the total cross-section surface of the die gap in the centering process is not altered so that a tubular shape may be produced with the given total cross-section and accordingly the given weight, which is determined by the die gap. An adjusting device for an annular die for the manufacture of plastics foils is already known, in which the die jacket is transversely adjustable in relation to the die core by means of clamp screws which lie parallel to the axis of the die and may be operated selectively positively (by advance of the screws) or negatively (by backing off of the screws). In this arrangement the clamp screws engage two flanges which are formed by an annular perforation running transversely to the axis of the die, and include a zone where the material is weak. The clamp screws of this known arrangement may be operated positively as well as negatively, i.e. they can either draw the two flanges together or spread them apart. A plurality of such clamp screws of the known arrangement are arranged on the flanges, with uniform peripheral distance. In the known arrangement the annular perforation is located directly in the die jacket, in the vicinity of the mouth of the die. This arrangement has the important disadvantage that an adjustment of the die gap by means of the clamp screws, the total cross-section surface of the die gap is not fulfilled, since on adjustment of the annular perforation closely adjacent to the die opening there results, between the end of the perforation and of the inner surface of the die jacket, a material cross-section which is substantially less than the distance of the end of the perforation from the external surface of the die jacket. Because of this slight wall thickness between the annular perforation and the inner surface of the die jacket, on adjustment of a clamp screw, because of the lack of rigidity of the die jacket provided by the slight distance referred to, this jacket is not adjusted as a whole but adjustment takes place merely in the region of the clamp screw operated, without the portions of the die jacket lying beyond this clamp screw being subjected to adjustment. Thus, in this arrangement, the requirement for the centering device not to alter the total cross-section surface of the die gap is not fulfilled, since an adjustment, the total cross-section surface is of necessity increased or reduced. In another known arrangement, the die jacket is connected to the tube-head jacket by an annular, spherically shaped sealing surface. The jacket and tube head jacket are connected to each other by means of spring-loaded retaining screws in such a way that the spherical sealing surfaces of both parts rest on each other. The clamp screws are arranged laterally alongside these retaining screws, and engage an external flange of the die jacket. If it is necessary for the die jacket to be centered in relation to the die core, the die jacket is pivoted in relation to the tube head on its spherical sealing surface by adjustment of the clamp screws. In this known centering device the total cross-section of the die gap is indeed maintained, but there is the important disadvantage that, upon adjustment of the die jacket in relation to the tube head jacket, a portion of the annular inner edge of the sealing surface of the die jacket enters into the annular channel conveying the plasticized material from the extruder to the die mouth. Through this rim surface, which projects into the channel, a portion of the material is dammed up and may subsequently cause damage by thermal decomposition and has a disadvantageous effect on the quality of the shape produced. If thermally sensitive material is used, for instance P.V.C., it is necessary to clean the entire tube head.

OBJECTS OF THE INVENTION

It is the object of the invention to provide an improved centering system for a die of the character described.

SUMMARY OF THE INVENTION

By the arrangement of the annular weakening, the annular channel, passing from the extruder to the die mouth, for the plasticized synthetic-resin material does not have its total cross-section altered. As a result of this arrangement of large spacing in accordance with the invention between the die mouth and the annular weakened area in the region of one of the die jacket clamping means is impossible, since because of the length of the die jacket an unweakened rigid part is formed which can be adjusted only as a whole, so that on centering the die jacket in relation to the die core, using the clamp screws, the total cross-section surface of the die gap is maintained. As a result, the centering device of the invention fulfills the requirements which are to be placed on these devices. A further advantage of the spacing between the die mouth and the annular weakening point is that only a slight adjustment of the clamp screw is necessary for centering.

The annular weakening may be arranged approximately in the centre of a tube head jacket carrying the die jacket. With the centering device in accordance with the invention, there is no longer any annular weakening at all in the die jacket, so that the die jacket is of necessity transversely adjusted as a rigid unit on operation of the clamping means, its total cross-section area being maintained.

Furthermore a groove formed by the annular weakening may be widened, towards the axis of the die, in such a manner that a weakening web, defined by walls running parallel, is formed. By the conical widening of the groove towards the die axis, a weakened zone in the form of an annular web lying approximately parallel to the die axis, which on account of its length increases the elasticity and accordingly the yielding capacity so that even slight adjustment forces at the clamping means suffice for carrying out the centering operation.

Furthermore in the widest portion of the annular groove there may be arranged an annular insert piece of heat insulating material, abutting against the external wall of the weakening web. This heat insulating insert piece or inlay has the purpose of compensating a heat loss at the annular weakening web, with consequent disadvantageous effect on the plastic material.

Finally, the clamping means may be comprised of a bolt provided at both ends with screw-threading, the lower end of which engages in a screw-threaded bore of the flange resting underneath the annular perforation, and carries an adjusting or tightening nut engaging on the underside of the flange resting above the annular perforation; and in that on the tube head there is a fastening ring spaced from the top surface of the upper flange, which ring is traversed by the upper end of the screw-threaded bolt carrying a second adjusting nut, between the second adjusting nut and the top surface of the upper flange a sleeve being arranged which engages through the fastening ring.

DESCRIPTION OF THE DRAWING

The sole figure of the accompanying drawing shows in cross-section and by way of example, an embodiment of the device in accordance with the present invention.

In the drawings a worm 1 is accommodated in an extruder jacket 2 which is surrounded by an annular heating belt 3. A tube head is positioned on the underside of the extruder jacket 2 by means of a centering projection 25 which is received in a corresponding recess in the extruder jacket 2. For fastening purposes, the connecting piece 6 of the tube head carries at its end turned towards the extruder jacket a flange ring 4 in which screws 24 are arranged which engage in screw-threaded bores of the extruder jacket; the extruder flange ring 4, which is surrounded by a heating belt 5, is screwed onto the connecting piece 6. The mandrel holder 28, holding the core, is arranged in the tube-head jacket 10. The mandrel holder 28 consists of one part together with the mandrel-holding ring 9, there being between the mandrel-holding ring 9 and the mandrel holder 28 radial connecting webs 29, so that the material extruded by the worm 1 can pass through the annular channel between the connecting piece 6 and the mandrel holder 28.

The mandrel holding ring carrying the mandrel holder 28 has a centering projection 21 which engages in a corresponding recess in the connecting piece. At the lower end of the connecting piece a fastening flange 7 is screwed on, in which screws 8 are arranged. The screws 8 engage in screw-threaded bores of the tube-head jacket 10 adjoining on the connecting piece 6, the mandrel holding ring at the same time being clamped by the screws 8 between the connecting piece 6 and the tube head jacket 10. The tube-head jacket 10 is surrounded by annular heating belts 13. At the lower end of the tube-head jacket the die jacket 14 is fastened by means of a fastening flange 15, which has screws 17 which engage from below in the tube-head jacket 10. The jacket carries an annular heating belt 16. The jacket 14 engages by means of a centering projection 18 in the tube head jacket. In the mandrel holder 28 the mandrel 11 is screwed, which at its lower end projects into the die core 30, which together with the die jacket forms the annular die.

At approximately the center of the tube-head jacket an annular groove 26 is provided, which, as can be seen in the figure, is widened towards the die axis, so that a narrow, annular weakening web 27 results, the lateral walls of which run approximately parallel to the die axis. In the widened portion of the perforation 26 an annular insert piece or inlay 12 of heat insulating material is arranged, which is to prevent a heat loss by radiation, which would be damaging to the plasticized synthetic-resin material. By the groove 26 the tube-head jacket 10, as the figure shows, is divided into two flange-like parts lying next to one another. In the upper flange-like part a clamp screw 20 is accommodated, which is constructed as screw-thread bolt and at both ends has screw-threading. The lower end of the bolt 20 engages in a screw-thread bore of the lower flange-like part of the tube-head jacket 10. This lower end of the bolt 20 carries a lower tightening nut 19, which engages at the underside of the upper flange of the tube-head jacket 10. The bolt 20 at its central region engages through a bore of the upper flange of the tube-head jacket 10 and moreover a bore of the fastening flange 7 which is at a distance. A bush or sleeve 22 is accommodated in the bore of the fastening flange 7, at the upper edge of which the upper tightening or adjusting nut 23 engages. The lower edge of the sleeve 22 abuts on the top side of the upper flange of the tube head jacket 10. The clamp screws 20 are distributed in plurality on the periphery of the fastening flange 7; for instance three clamp screws 20 can be provided, with an angular distance in each case of 120°.

The centering device of the invention functions as follows: if in assembling the core 30, on introducing the mandrel 11 into the mandrel holder 28 the centering is not accurate enough in relation to the die jacket 14, the upper and lower tightening or adjusting nuts 23 and 19 of the centering screws 20 are loosened. If the die gap, as a result of the eccentric position of the core, is wider on the left-hand side than it is on the right, the two flanges of the tube-head-jacket must be held apart from each other, which takes place by tightening the lower nut 19. When the centered position has been reached, the nut 23 also is tightened; it acts as counter-nut. On the tightening of the nut 19 the lower flange of the tube-head jacket is pressed downwards by the downwardly conveyed bolt 20, so that the die gap on the left-hand side is reduced until a centered position has been reached. If the die gap on the left-hand side is smaller than on the right, the two flanges of the tube-head jacket 10 must be held or clamped together. For this purpose here also in the first place the nuts 23 and 19 are loosened, then the upper nut 23 is tightened, as a result of which the bolt 20 is raised above the bush 22 and the upper flange of the tube-head jacket 10, so that the lower web of the tube-head jacket is guided to the upper web. Hereby the die gap on the left-hand side is widened until a central position has been reached. Then the lower nut 19 is tightened, said lower nut itself acting as counter-nut. It is more advantageous to provide four clamp screws 20 having an angular distance of 90°, so that on the centering on one side, the nut 19 is tightened, whereas at the 180° oppositely-lying side the nut 23 is tightened. In reverse, in each case the counter-nuts are tightened by the screw 20.

I claim:

1. A centering device for an annular die for the manufacture of shapes of a plastic material comprising a die jacket, a die core extending through said jacket and defining an annular clearance therewith, a nozzle fixed to said die jacket and defining an annular passage for said material registering with said clearance and forming a die mouth remote from said die jacket, said die jacket being provided with a pair of axially spaced flanged portions unitarily connected by an annular cylindrical weakened web, said die jacket being transversely adjustable in relation to said die core, and angularly spaced clamping means extending parallel to the die axis and engaging said flange portions separated by said annular weakened web of the die jacket, the axial spacing of the die mouth from the annular weakened web in relation to the rigidity of the die jacket being such that upon adjustment of the clamping means there is no significant change in overall cross-sectional area of the die orifice defined by the die jacket.

2. A device in accordance with claim 1 wherein the annular weakened web is arranged approximately at the center of a tube-head jacket forming part of the die jacket.

3. A device as claimed in claim 1 wherein a groove formed by the annular weakened web widens toward the die axis, in such a manner that said web defined by walls running substantially parallel to the die axis.

4. A device as claimed in claim 3, wherein the widened portion of the annular weakened web is provided with an annular insert piece consisting of heat-insulating material and abutting against the external wall of the weakened web.

5. A device as claimed in claim 4, wherein the clamping means consists of a double-ended bolt provided at both ends with screw-threading, an end of which engages in a threaded bore in the die jacket at one side of the annular weakening and the other end of the bolt passes through a part of the die jacket, a first adjusting nut is provided on the bolt in the groove formed by the annular weakened web and a second adjusting nut is provided adjacent that end of the bolt which passes through the die jacket.

6. A device as claimed in claim 5, wherein the die jacket is provided with a fastening flange separated from the die jacket and leaving a gap in the region of the bore for the said bolt, the fastening flange being also provided with a bore for the bolt, the bore having a sleeve arranged to act between the second adjusting nut and the surface of the die jacket around the bore which passes through the part of the die jacket.

References Cited

UNITED STATES PATENTS

| | | | |
|---|---|---|---|
| 3,339,235 | 9/1967 | Nossol | 18—14 V |
| 3,453,690 | 7/1969 | Mayner | 18—14 V |
| 3,471,899 | 10/1969 | Ronden | 18—14 V |

H. A. KILBY, Jr., Primary Examiner

U.S. Cl. X.R.

18—12 DV